United States Patent
Kato et al.

[19]

[11] Patent Number: 5,856,711
[45] Date of Patent: Jan. 5, 1999

[54] POWER-SUPPLY DISTRIBUTOR FOR USE IN VEHICLES

[75] Inventors: Akira Kato; Nozomi Kawasaki, both of Shizuoka, Japan

[73] Assignee: Yazaki Corporation, Tokyo, Japan

[21] Appl. No.: 813,966

[22] Filed: Mar. 3, 1997

[30] Foreign Application Priority Data

Mar. 4, 1996 [JP] Japan .................................. 8-046110

[51] Int. Cl.⁶ ...................................................... H02H 3/08
[52] U.S. Cl. ...................... 307/10.6; 307/131; 307/10.7; 307/38; 361/63; 361/94
[58] Field of Search ................................... 307/9.1–10.8, 307/125, 126, 130, 131, 139, 140, 38, 39; 361/62, 63, 64, 65, 66, 70, 71, 87, 93, 94, 102, 114, 170, 187; 701/1, 29, 36

[56] References Cited

U.S. PATENT DOCUMENTS

| | | | |
|---|---|---|---|
| 4,639,609 | 1/1987 | Floyd et al. ................................ | 307/38 |
| 4,799,126 | 1/1989 | Kruse et al. ................................ | 361/93 |
| 4,807,135 | 2/1989 | Tamai ........................................ | 701/36 |
| 4,942,571 | 7/1990 | Moller et al. ............................ | 307/10.1 |
| 5,315,293 | 5/1994 | Kamiya ...................................... | 361/94 |
| 5,388,022 | 2/1995 | Ahuja ........................................ | 361/94 |
| 5,608,271 | 3/1997 | Saka et al. ............................... | 307/10.1 |

*Primary Examiner*—Jeffrey Gaffin
*Assistant Examiner*—Peter Ganjian
*Attorney, Agent, or Firm*—Armstrong, Westerman, Hattori, McLeland & Naughton

[57] ABSTRACT

Power supplied from a battery via a power-supply line is distributed via switching means to load drive lines, connected to loads, respectively. Memory means stores the data of current-breaking time characteristics providing the breaking time which corresponds to the amount of each excessive current and the capacity of each load. When any of the current detection means has detected an excessive current flowing through any of the load drive lines, control means breaks power supplied via the load drive line to the load, by opening the switching means immediately after the corresponding breaking time has elapsed.

8 Claims, 7 Drawing Sheets

POWER-SUPPLY DISTRIBUTOR FOR USE IN VEHICLES

BACKGROUND OF THE INVENTION

1. Field of the Invention

The present invention relates in general to a power-supply distributor for use in vehicles, and more particularly to such a power-supply distributor that distributes power from a battery mounted in vehicles to the various portions.

2. Description of the Prior Art

In the conventional vehicle-mounted power supply, generally, as shown in FIG. 6, power supplied from a battery 1 is first fed to a power-supply block A via a power-supply line 3 protected by a fusible link (FL) 2. Subsequently, power thus fed to the power-supply block A is divided by fuses A1*a* and A1*b* to load drive lines 5*a* and 5*b* on the downstream side and then fed to loads 6*a* and 6*b* via relays A2*a* and A2*b* which control load driving, respectively. The load drive lines 5*a* and 5*b* employ cables having a diameter which corresponds to the capacity of the load connected thereto. Switches 7*a* and 7*b* are used to turn on and off the loads 6*a* and 6*b* respectively. When either of those switches is turned on, a relay coil L is conducted to close a relay contact C, electric power is supplied from the battery 1 to the loads 6*a* and 6*b* via the fusible link (FL) 2, the fuses A1*a* and A1*l*, and the relay contacts C in this order.

One problem to be solved is differences in the specifications of the vehicles. As shown in FIGS. 7(*a*) and 7(*b*) respectively, there possibly are, for example, two cases of specifications such that, in one case, the load 6*a* consists of two bulbs of 60 watts and 12 watts (72 watts in total) and, in the other case, the load consists of two 60-watt bulbs (120 watts in total). In such cases, the abovementioned conventional device needs to change the capacity of the fuse A1*a* in the power-supply block A correspondingly with the specifications. This would increase the number of parts to be prepared in the power-supply block containing the fuse as the specifications become complicated, reducing productivity and also making it difficult for the manufacturer to manage that number.

Also, in the case where the fuses A1*a* and A1*b* are used to protect the load drive lines 5*a* and 5*b* and the loads 6*a* and fib, the fuse capacity is set in standardized step-wise values, for example, 10A, 15A, etc. Thus, the cable may have over-protection from the fuses, as can be seen from the comparison between the current-time characteristics of the fuming of the load drive lines (solid line) and those of the melting of the fuses (broken line) in FIG. 8, thus reducing the efficiency of feeding power. The current-time characteristics of the fuming of the load drive lines are the current over time values causing the burning or smoking of the load drive line cables resulting from the excessive heat generated by the specified amount of current over the specified period of time.

Moreover, as can be seen from the comparison between the motor load constant-current characteristics and lock-current characteristics shown in FIG. 8 and the fuse melting characteristics shown in FIG. 3, the constant-current operation causes no problem, whereas the lock-current operation may cause fuse melting. In order to prevent such problems, the fuse capacity may have to be upgraded by one step.

SUMMARY OF THE INVENTION

It is therefore a main object of the present invention to eliminate the problems encountered in the prior art power-supply distributor and to provide a power-supply distributor for use in vehicles which improves the efficiency of feeding power with load drive lines by providing a protection for those drive lines in response to a current flowing through the load.

Another object of the present invention is to provide a power-supply distributor for use in vehicles which reduces to the minimum the modifications of the hardware due to the variations in the load capacity and others simultaneously with improving the power feeding efficiency as described above.

To achieve the abovementioned main object of the present invention, a power-supply distributor for use in vehicles, as shown in the block diagram in FIG. 1A, includes switching means 101*a*, 101*b*, etc. which have a control input; current detection means 102*a*, 102*b*, etc. which detect an amount of current flowing through the load drive lines 5*a*, 5*b*, etc. connected to loads 6*a*, fib, etc., to which electric power supplied from a battery I via a power-supply line 3 is distributed via the switching means; memory means 104 which stores the current-breaking time characteristics data which determines breaking time corresponding to the capacity of the load and also the amount of an excessive current; and control means which breaks power to the load via the load drive lines by supplying a control input signal to the switching means to open them when the breaking time in the memory means has elapsed, which time corresponds to the amount of an excessive current, immediately after this current was detected by the current detection means.

In the construction above, a power-supply distributor according to the present invention includes a memory means 104 which stores the current-breaking time characteristics data determining the breaking time which corresponds to the capacity of loads 6*a*, 6*b*, etc. and also the amount of an excessive current; and control means 103*a* which supplies a control input signal to switching means 101*a*, 101*b*, etc. to open them when the breaking time corresponding to that value stored in the memory means has elapsed, thus breaking power fed to the loads via load drive lines 5*a*, 5*b*, etc., respectively.

It is thus possible to break power supply in an appropriate breaking time which takes into consideration the capacity of the loads, i.e. the fuming characteristics of the load drive lines, when an excessive current has been detected.

A power-supply distributor for use in vehicles, as shown in the block diagram in FIG. 1A, includes use said control part, in the power-supply distributor as discussed above, that supplies a control input signal to the switching means to open or close them when operation switches 7*a*, 7*b*, etc. have turned the loads on or off.

According to this construction, the switching means 101*a*, 101*b*, etc. to break power supply in order to protect the load drive lines from an excessive current are turned on or off in response when the operation switches 7*a*, 7*b*, etc. have turned the loads 6*a*, 6*b*, etc. on or off, so that there is no need to separate the switching means in the same distributor.

To achieve the above object, a power-supply distributor for use in vehicles, as shown in the block diagram in FIG. 1A, includes a plurality of switching means 101*a*, 101*b*, etc. which have a control input; a plurality of current detection means 102*a*, 102*b*, etc. which detect the amount of a current flowing through load drive lines 5*a*, 5*b*, etc. in the distributor which feeds power given from a battery 1 via a power-supply line 3 to loads 6*a*, 6*b*, etc. via the switching means; memory means 104 which stores a plurality of current-breaking time characteristics data pieces determining breaking time which corresponds to the amount of an excessive current; and control means 103a which breaks power supply to the loads via the load drive lines by supplying a control input signal to the corresponding one of said switching means to open it when the breaking time in said memory means has elapsed, which time corresponds to the amount of the excessive current and the capacity of the loads to which are connected the load drive lines through which that current flowed, immediately after that excessive current was detected by the current detection means, respectively.

In this construction, the distributor includes memory means 104 which stores a plurality of current-breaking time characteristics data pieces determining breaking time which correspond to the amount of an excessive current and also the capacity of a plurality of loads 6a, 6b, etc. respectively; and control means which supplies a control input signal to switching means 101a, 101b, etc. to open them when a breaking time stored in the memory means has elapsed, which time corresponds to the amount of an excessive current and also the capacity of loads 6a, 6b, etc. to which are connected load drive lines 5a, 5b, etc. through which the excessive current flowed, immediately after that excessive current was detected by current detection means 102, 102b, etc., respectively.

It is thus possible to break, when an excessive current has flowed through a load drive line, power in an appropriate breaking time which corresponds to the capacity of a load, i.e. the fuming characteristics of the load drive line, and only by changing the current-breaking time characteristics data stored in the memory means for each of different capacity of loads in different products.

A power-supply distributor for use in vehicles, as shown in the block diagram of FIG. 1A, includes the memory means in such distributors as mentioned above, which includes an external nonvolatile memory which is detachable and also whose contents can be rewritten electrically.

In this construction, a memory means 104 comprises an external nonvolatile memory which is detachable and whose contents can be rewritten electrically, so that it is easily possible to change the current-breaking time characteristics data stored in the memory means.

To achieve the above object, a power-supply distributor for use in vehicles, as shown in the block diagram of FIG. 1B, includes switching means 201 with a control input placed between a battery 1 and a plurality of load drive lines 5a, 5b, etc. connected to loads 6a, 6b, etc. respectively, to feed power given by the battery 1 via a power-supply line 3 to those loads in the distributor; current detection means 202a, 202b, etc. which detect the amount of a current flowing through said load drive lines; memory means 204 which stores a plurality of current-breaking time characteristics data pieces determining breaking time which corresponds to the capacity of the loads and the amount of an excessive current; and control means 203a which breaks power for one of those loads via one of said load drive lines by supplying a control input signal to the switching means to open it when the breaking time has elapsed which corresponds to the largeness and the capacity of that load through which the excessive current flowed, immediately after that current was detected by the current detection means.

In this construction, the power-supply distributor for use in vehicles uses memory means 204 which stores a plurality of current-breaking time characteristics data pieces determining the breaking time which corresponds to the capacity of each of a plurality of loads 6a, 6b, etc. and also to the amount of an excessive current; and control means 203a which breaks power for the load via all the load drive lines 5a, 5b, etc. by supplying a control input signal to switching means 201 to open it when the breaking time stored in the memory means has elapsed which corresponds to the capacity of loads 6a, 6b, etc. to which are connected the load drive lines 5a, 5b, etc. through which the excessive current flowed and also to the amount of that current detected by current detection means 202a, 202b, etc., respectively.

It is thus possible to break power in appropriate time which corresponds to the capacity of one of a plurality of loads through which an excessive current has flowed, i.e. the fuming characteristics of the corresponding one, if any, of a plurality of load drive lines, only by proving one switching means for the plurality of the load drive lines, realizing a simple construction.

A power-supply distributor for use in vehicles, as shown in the block diagram of FIG. 1B, includes diagnosis means 203b which decides one of a plurality of load drive lines through which has flowed an excessive current which is responsible for the breaking of power supply in a distributor as discussed above.

This construction comprises diagnosis means 203b, which decides any of a plurality of load drive lines through which has flowed an excessive current which is responsible for the breaking of power, so that even if power for all loads is broken, it is possible to easily find any of the loads or the load drive lines which are responsible for the breaking.

A power-supply distributor for use in vehicles, as shown in the block diagram of FIG. 1B, includes display means 205 which indicates the results of diagnosis by said diagnosis means in a power-supply distributor as discussed above.

This construction comprises display means 205, which indicates the results of diagnosis by diagnosis means, so that even if power for all loads is broken, it is possible to easily indicate any of the loads or the load drive lines which are responsible for the breaking.

BRIEF DESCRIPTION OF THE DRAWINGS

The above and other objects, aspects, features and advantages of the present invention will become more apparent from the following detailed description with reference to the accompanying drawings, in which.

DESCRIPTION OF THE PREFERRED EMBODIMENTS

Various embodiments of the present invention will be described with reference to the accompanying drawings.

Figure 1A:
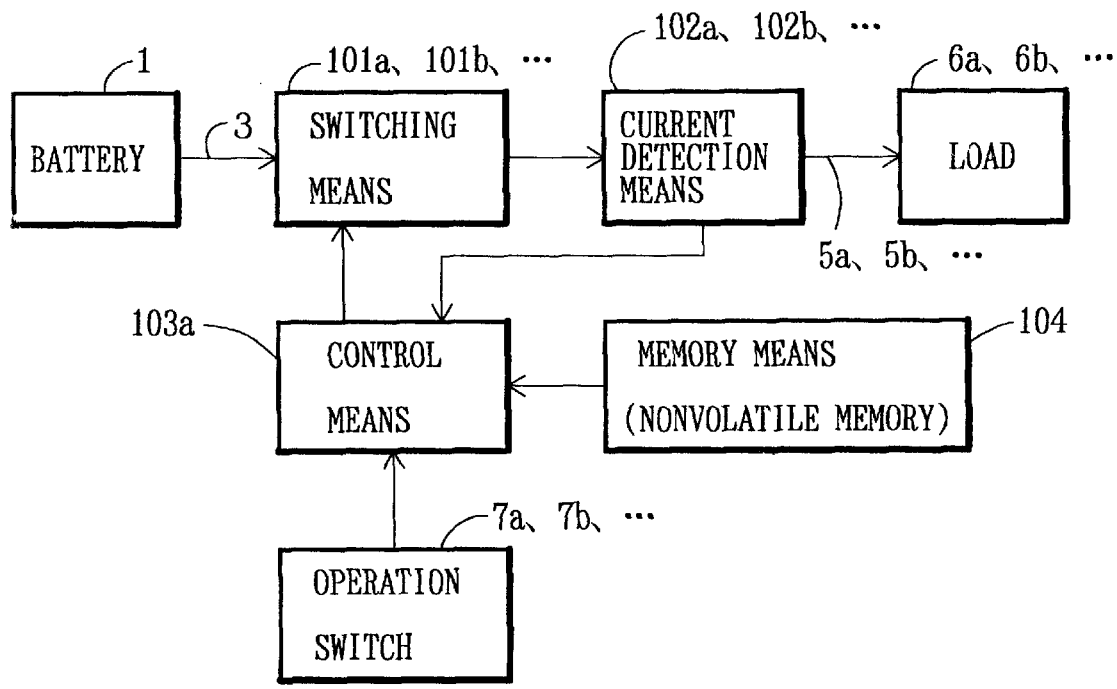
FIG. 1A and 1B are block diagrams illustrating the basic construction of a power-supply distributor for use in vehicles according to the present invention.
Figure 1B:
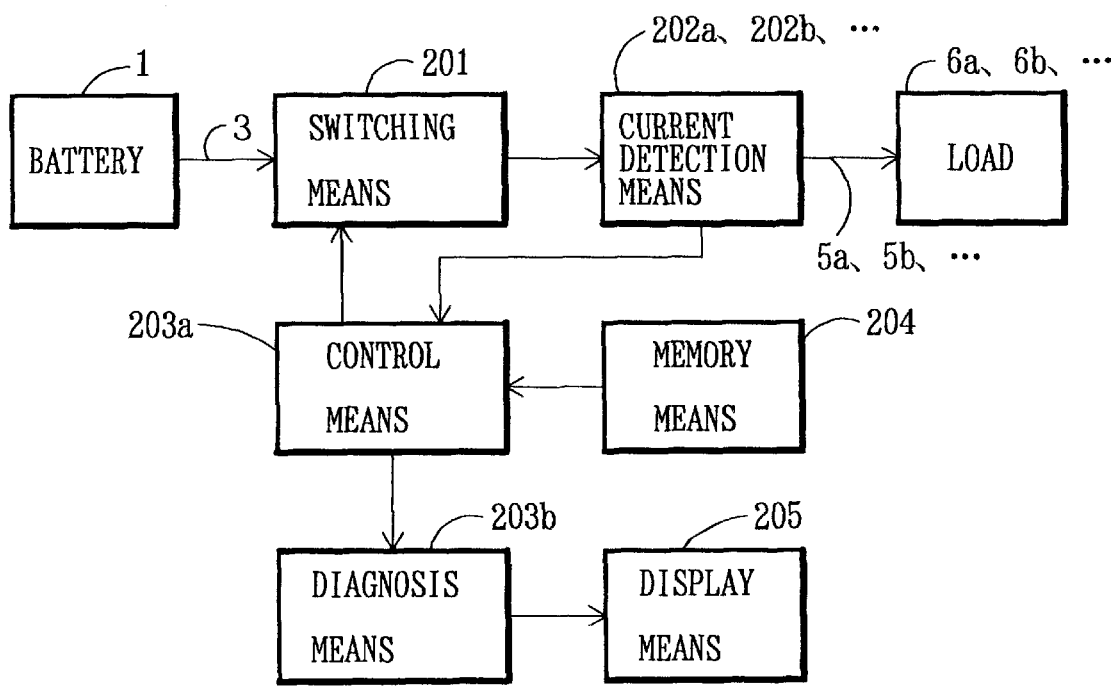
Figure 2:
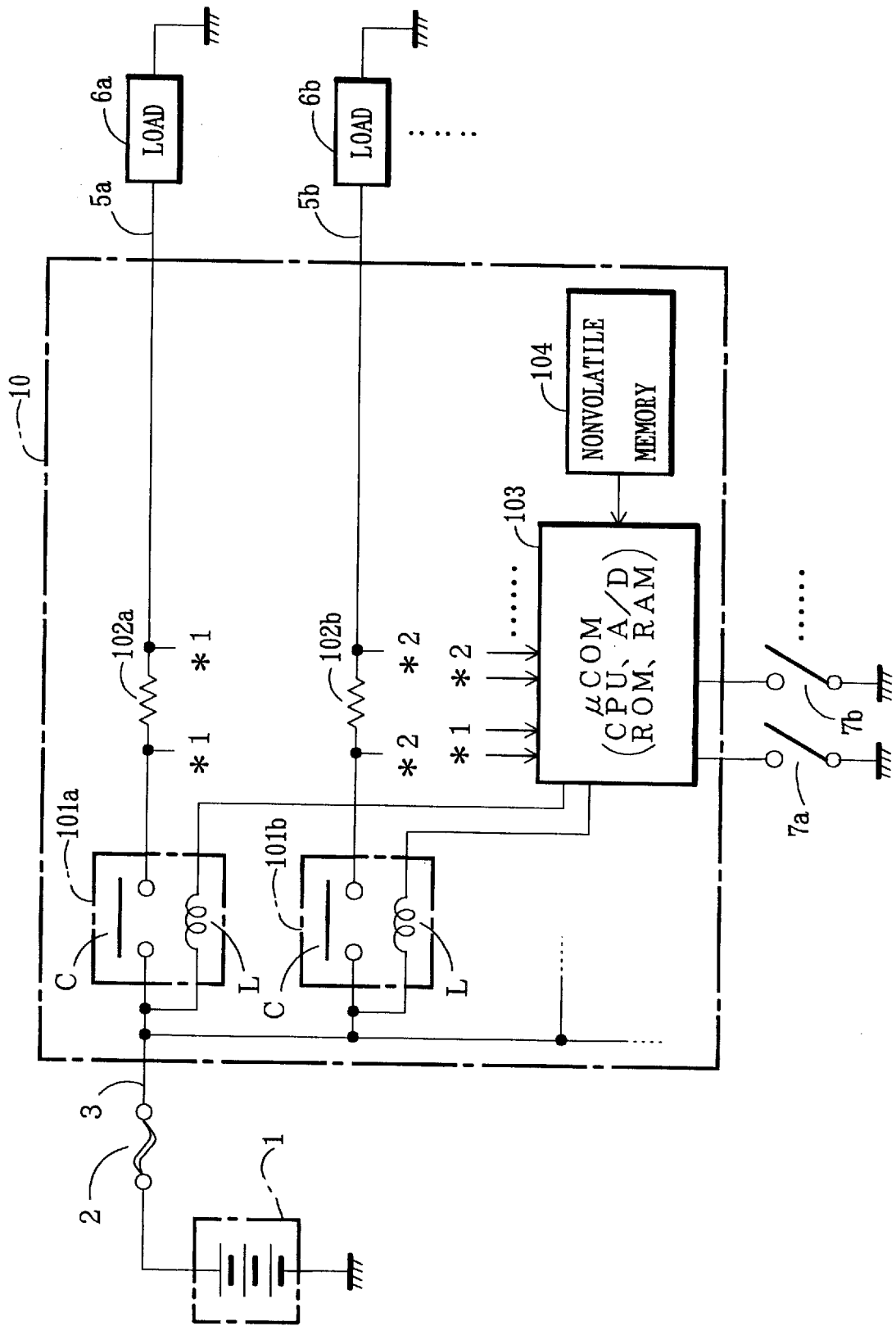
FIG. 2 is a circuit diagram illustrating an embodiment of the power-supply distributor for use in vehicles according to the present invention.
Figure 6:
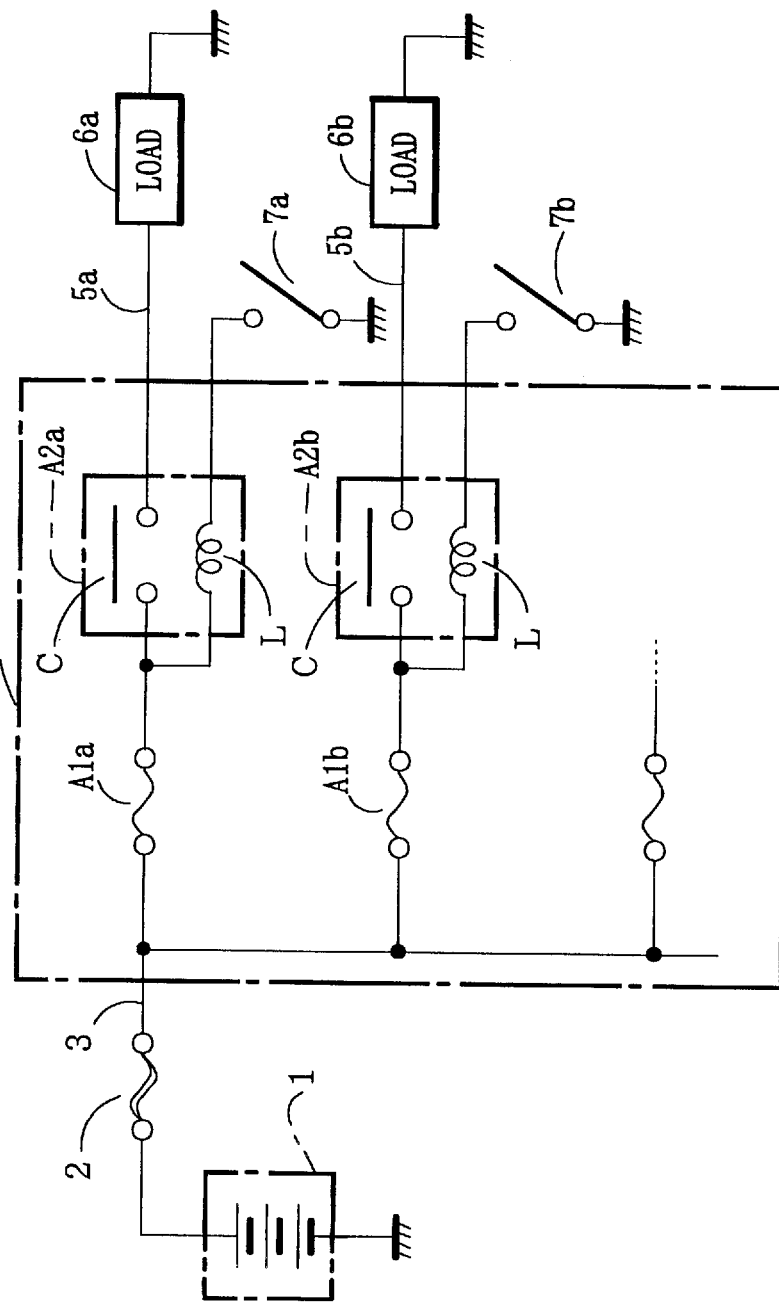
FIG. 6 is a circuit diagram illustrating an example of the conventional power-supply distributor for use in vehicles.
Figure 7A:
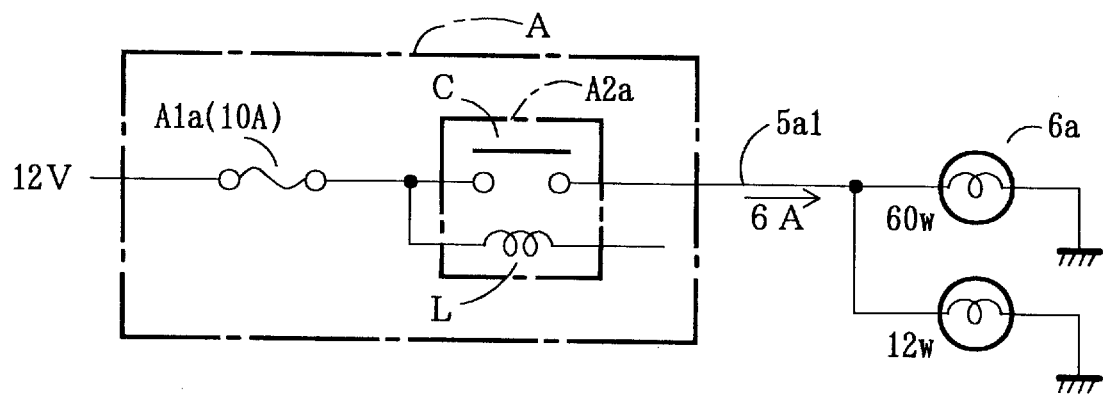
FIG. 7A and 7B are circuit diagrams for illustrating the problems of the device shown in FIG. 6.
Figure 7B:
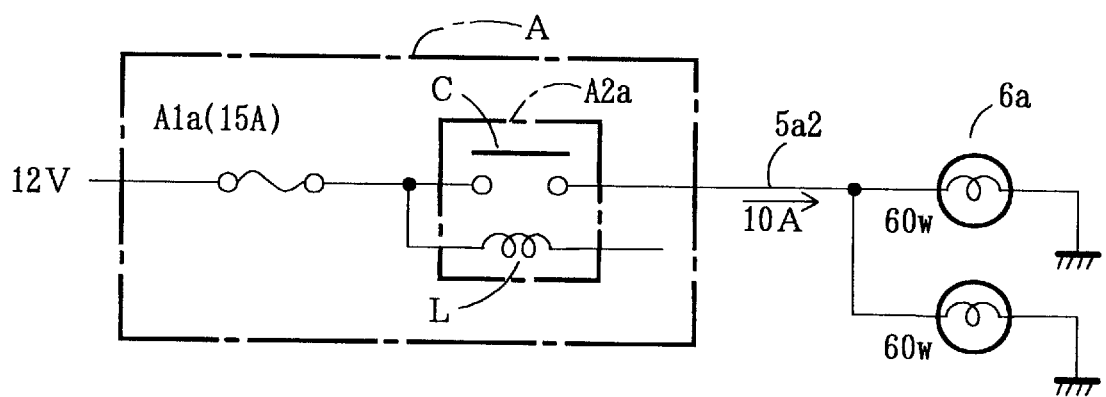

FIG. 2 is a circuit diagram illustrating an embodiment of a power-supply distributor for use in vehicles according to the present invention, in which the same or similar reference numerals as those given in FIG. 6 are applied to the same or similar parts and elements, and the description of the same or similar parts and elements will be omitted.

In FIG. 2, a block indicated by reference numeral 10 is an example of a power-supply distributor for use in vehicles according to the present invention; and this device 10, like said power-supply block A, is supplied with power given from a battery 1 via a power-supply line 3 protected by a fusible link (FL) 2 and the power is distributed to a plurality of loads 6a, 6b, etc. via a plurality of load drive lines 5a, 5b, etc. respectively. Those drive lines 5a, 5b, etc., may be a covered wire capable of handling the capacity of loads connected to those drive lines. The device 10 turns on or off the loads 6a, 6b, etc. in response to the on/off operation of operation switches 7a, 7b, etc., which are placed in an operation panel not illustrated.

In FIG. 2, the actual distances among the battery 1, device 10, and loads 6a, 6b, etc. are not reflected; in practice, they are located far away, so that the power-supply line 3 and the load drive lines 5a, 5b, etc. connecting those may actually be very long.

A device 10 has relays 101a, 101b, etc. as switching means, with a control input (from a control part 103, described below) corresponding to loads 6a, 6b, etc. respectively. The device 10 feeds power supplied via a power-supply line 3 to a load 6a via a relay contact C in the relay 101a, to a current detection resistor 102a as current detection means, and to a load drive line 5a in this order. At the same time, the device 10 feeds the power also to a load 6b via a relay C in the relay 101b, to a current detection resistor 102b as current detection means, and to a load drive lines 5b in this order.

The device 10 also has a control part 103 comprising a microcomputer (μCOM) which incorporates a central processing unit (CPU) operating on predetermined programs, read only memories (ROMs) storing such programs, random access memories (RAMs) having areas for storing various data or for use during processing, and an analog-digital converter (A/D) converting analog signals to digital ones.

Operation switches 7a, 7b, etc. (provided in an operator panel), both ends of the current detection resistors 102, 102b, etc., and a nonvolatile memory 104 are all connected to the input parts of the control part 103. The memory 104 includes EEPROMs given as memory means to store the data of current-breaking time characteristics for each load. Relay coils L of relays 101a, 101b, etc are connected to the output ports of the control part 103.

There are two ways of storing the necessary data of current-breaking time characteristics into the nonvolatile memory 104: by storing such data into the memory 104 when the breaking time for each load has been decided and then incorporating that memory 104 into the device 10: or by incorporating it into the device 10 beforehand and then externally writing necessary data into it electrically when the breaking time for each load has been decided. In the latter case, however, it is necessary to provide input terminals for writing.

In either case, the current-breaking time characteristics data stored in the nonvolatile memory 104 is logically classified into four conditions labelled Areas A through D, corresponding to the amount of a current flowing through the loads and the breaking time for each of those conditions, as shown in Table 1.

Specifically, the condition in Area A has $I_1$ Amperes or more to trigger rapid breaking in a self-protection mode to protect the load drive lines. The condition of Area B has $I_2$ Amperes to $I_1$ Amperes to trigger breaking after a duration of 0.01 second, in a load rushing mode. The condition of Area C has $I_3$ Amperes to $I_2$ Amperes to trigger breaking after a duration of 1 second in an abnormality detection mode. The condition of Area D has $I_4$ Amperes or less in an ordinary operation mode in which no breaking occurs. It is thus necessary to provide a nonvolatile memory 104 which stores the data of current-breaking time characteristics corresponding to the characteristics and capacity of the loads. However, it is totally unnecessary to change any part other than this memory 104 in the same device, and basically only one product number is enough for each device, so that it is sufficient for the car manufacturer to only decide the contents of that nonvolatile memory for the specifications on the assembly line.

TABLE 1

|  |  | Area A | Area B | Area C | Area D |
|---|---|---|---|---|---|
| Load 6a | Current (A) | $I_1$ or more | $I_2$ to $I_1$ | $I_3$ to $I_2$ | $I_4$ or less |
|  | Time (sec) | Rapid breaking | 0.01 | 1 | No breaking |
| Load 6b | Current (A) |  |  |  |  |
|  | Time (sec) |  |  |  |  |
| Load | Current (A) |  |  |  |  |
|  | Time (sec) |  |  |  |  |

In this construction, the CPU of μCOM 103 changes the status of the output port connected with the relay coil L of a relay 101a from a high level to a low level when the operation switch 7a has been turned on. Subsequently, a current flows through the battery 1, the FL2, the power-supply line 3, and the relay coil L of the relay 101a in this order, to close the relay contact C of the relay 101a which has been open. When the relay contact C of the relay 101a has been closed, a current flows through the battery 1, the FL2, the power-supply line 3, the relay contact C of the relay 101a, the current detection resistor 102a, the load drive line 5a, the load 6a, and the ground in this order, to drive the load 6a and, at the same time, to create a voltage of a level corresponding to the amount of the current across the current detection resistor 102a.

The voltage across the current detection resistor 102a is converted at an A/D converter in the μCOM 103 into a digital signal and then read out by the CPU. The CPU, based on the read out voltage values, detects the amount of the current flowing through the load drive line 5a and then reads out the breaking time corresponding to the thus-detected amount of current, from the nonvolatile memory 104. If the CPU has detected an excessive current due to a short-circuiting between, for example, the load drive lines or between any of the load drive lines and the body on the side of the load 5a, it reads out the specified breaking time corresponding to the amount of this excessive current from the nonvolatile memory 104 and starts counting time.

When the counted time has reached the specified breaking time, the CPU changes the previously high level status of the output port to a low level, thus stopping conducting to the relay coil L of the relay 101a. Then, the relay contact C of the relay 101a which has been closed is opened, thus breaking power which has been fed to the load 6a via the relay contact C of the relay 101a. When the relay contact C of the relay 101a is thus opened to break power to the load 6a, the excessive current to the load drive line 5a is also stopped, so that the line 5a is protected.

Figure 3:
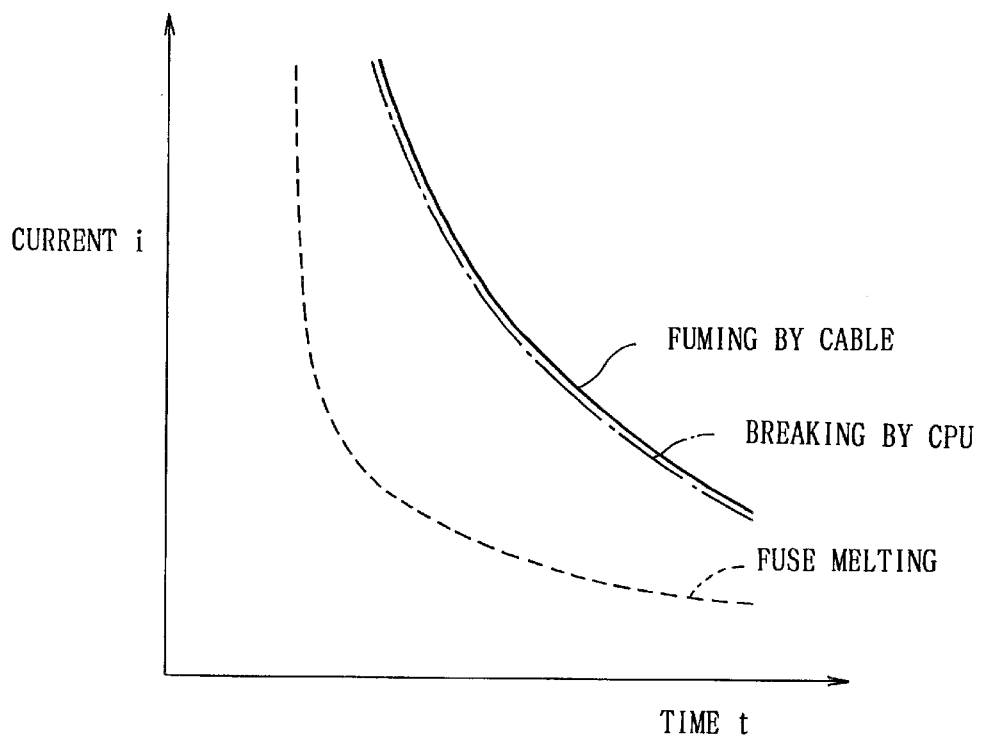
FIG. 3 is a graph showing the effects by a device illustrated in FIG. 2.
Figure 8:
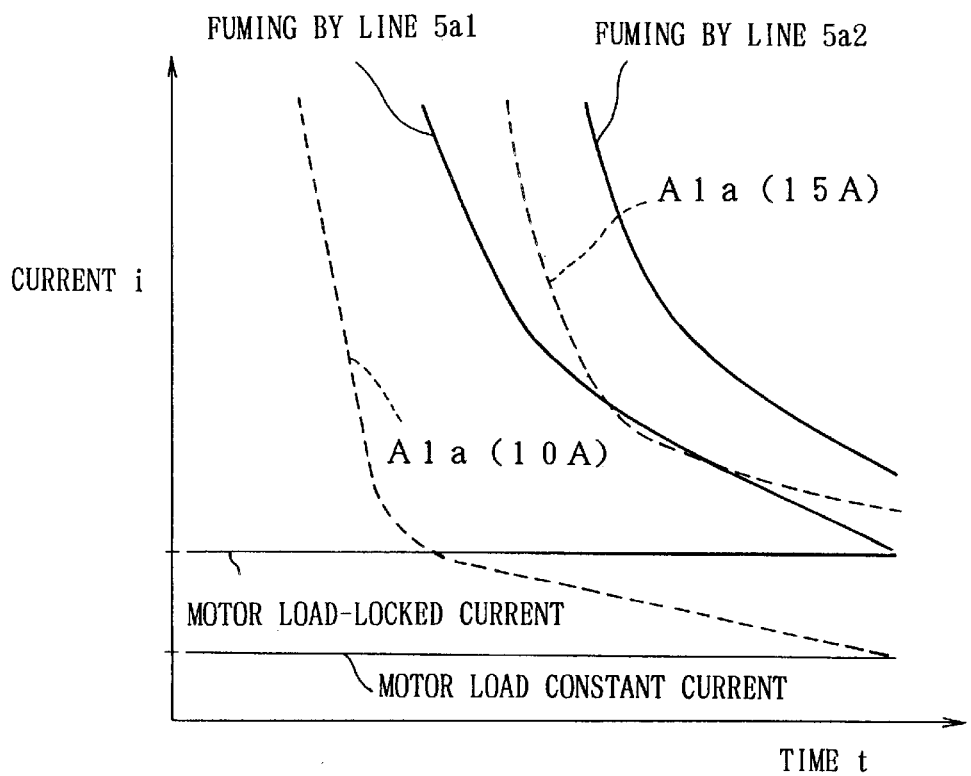
FIG. 8 is a graph describing the problems of the device shown in FIG. 6.

No breaking time is stored in the nonvolatile memory 104 for the condition when an amount of current detected by the CPU is below the prescribed value, $I_4$, so that the CPU will not provide the breaking control when it detects such a small current. Also, the breaking time is set to be somewhat shorter than a period of time after which the load drive line 5a may begin to burn or smoke when an excessive current had continued to flow through it. The larger the amount of the excessive current, the shorter is the value of the breaking time. The breaking time is thus set according to the amount of current, to permit conducting to the load drive line 5a up to its critical point before starting to burn/smoke, thus allowing an efficient, supply of power. As can be seen from the graph of FIG. 3, the curve of the breaking characteristics controlled by the CPU indicated by a dash-and-dot line can be set near to the curve of the cable's fuming characteristics indicated by a solid line, as compared to the curve of the fuse's melting characteristics indicated by a dotted line.

Also when the operation switch 7b is turned on, the CPU of μCOM 103 carries out the same control as in the case of the switch 7a, so that the load drive line 5b is protected from the conducting of an excessive current.

The abovementioned operations are hereinafter detailed with reference to the flowchart of FIG. 4 illustrating the processing by the CPU of μCOM 103 shown in FIG. 2.

Figure 4A:
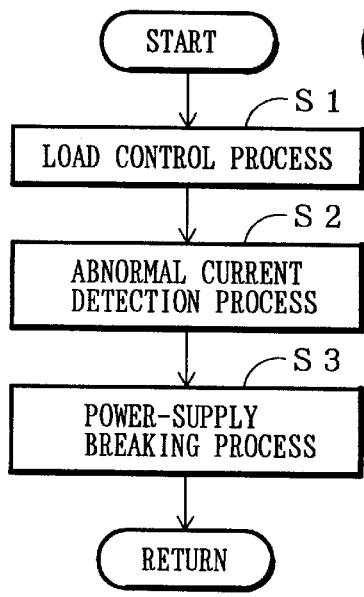
FIG. 4A and 4B are flowcharts showing the processing by the CPU of a μCOM illustrated in FIG. 2.

The CPU, upon power application, starts the processing of the main routine of FIG. 4A, to control the loads at its first step S1. During this load control processing, the CPU monitors operation switches 7a, 7b, etc. When the CPU detects any of them to have been turned on, the CPU changes the output status level of the output port so that relays 101a, 101b, etc. respectively connected to the loads 6a, 6b, etc., corresponding to that operation switch will be closed or opened. Subsequently, the CPU goes to step S2 to detect an abnormal current (described later) and then advances to step S3 to break power depending on the results of the detection of the abnormal current conducted at step S2 and, finally, returns to said load connection processing.

Figure 4B:
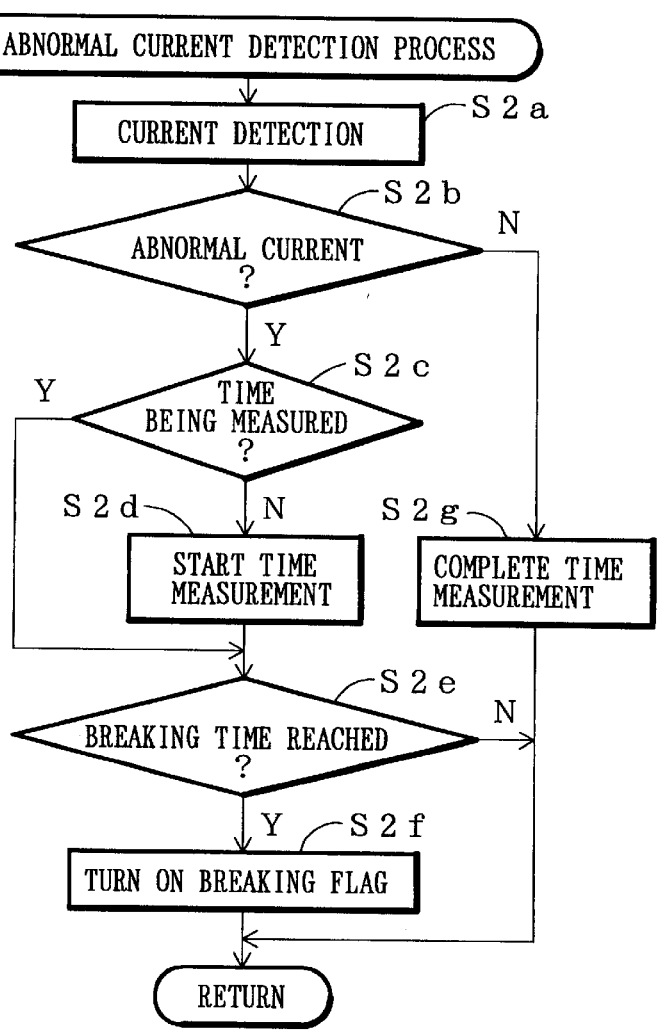

The abovementioned abnormal current detection processing comprises a subroutine of FIG. 4B, at whose first step of S2a, the CPU detects a current flowing through any of the load drive lines 5a, 5b, etc. To do so, the CPU performs A/D conversion of the voltage across each of current detection resistors 102a, 102b, etc. (the current detection means) and then reads in the conversion results sequentially. At step S2b, the CPU decides whether the thus-detected current value is an abnormal current. Specifically, the CPU decides whether a breaking time corresponding to that current value for the load connected to any of the load drive lines 5a, 5b, etc. is stored in the nonvolatile memory 104.

If a breaking time for that current value is found, the CPU decides YES at step S2b and goes to step S2c to decide whether a timer created in a prescribed area of the RAM section is counting the breaking time. If NO is decided at step S2c, i.e. if the counter is not counting the breaking time, the CPU goes to step S2d to start the counting of the breaking time and then advances to step S2e.

At step S2e, the CPU decides whether a time count by the breaking time timer which started at step S2d has reached the prescribed breaking time. If it has not reached yet, i.e. NO is decided at step S2e, the CPU returns to the main routine. If the timer count has reached the breaking time, the CPU advances to step S2f to turn on the breaking flag created in a prescribed area of the RAM section and then returns to the main routine. This breaking flag is used, when an abnormal current is detected to be flowing through any of the loads during the power breaking processing at step S3 of the main routine, to open the relay corresponding to that load so that power can be broken to that load.

If NO is decided at step S2b above, on the other hand, the CPU goes to step S2g to finish the counting by the counter which started at step S2d above and then returns to the main routine. At this step S2g, the CPU resets counting by stopping the timer for breaking, thus effectively coping with an abnormal current whose duration does not reach any breaking time.

As can be understood from the above description with reference to the flowchart of FIG. 4, if an excessive current is detected at any of the current detection resistors 102a, 102b, etc. and when, based on the amount of that current, the corresponding braking time of the current-breaking time characteristics data stored in the RAM section (i.e., the memory means) has elapsed, the CPU of μCOM 103 serves as control means 103a and supplies a signal so as to conduct a current to the relay coil L provided as a control input to relays 101a, 101b, etc. (i.e., the switching means) in order to open relay contact C of the relevant relay, thus breaking power which has been fed to loads 6a, 6b, etc. via load drive lines 5a, 5b, etc.

Aside from the abovementioned embodiment, where relays 101a, 1-1b, etc. are closed or opened in response to the turning on and off of the operation switches 7a, 7b, etc., other examples may be possible where each of loads 6a, 6b, etc. has a built-in power switch to supply power when, for example, an ignition switch is turned on, in such a way that when an excessive current is detected, the ignition switch, which is otherwise turned on to close the relays 101a, 101b, etc., would open them. A similar construction may be employed when the loads 6a, 6b, etc. come in a headlamp or tail lamp which lights when a corresponding lighting switch is turned on.

Figure 5:
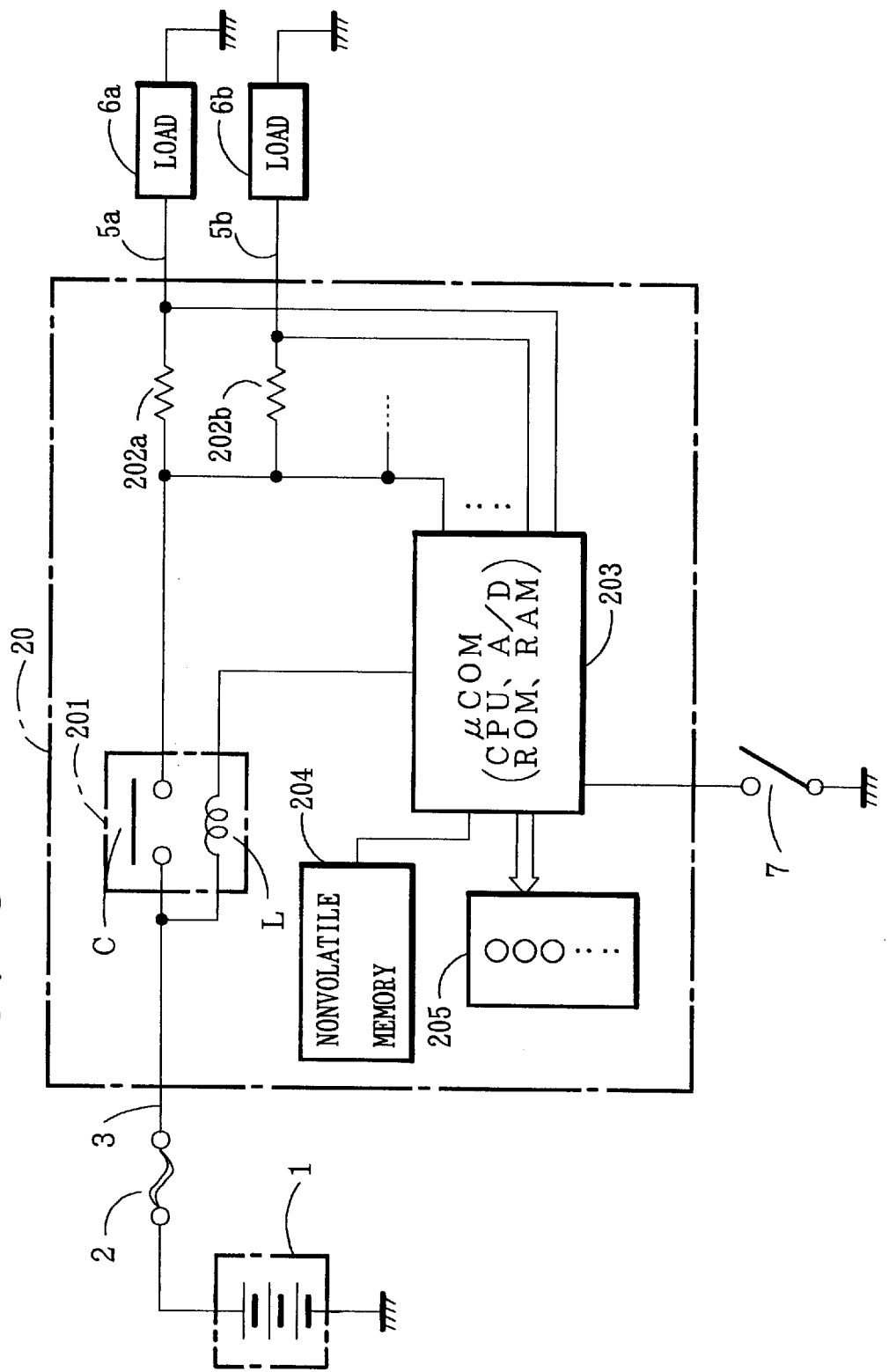
FIG. 5 is a circuit diagram illustrating another embodiment of the power-supply distributor for use in vehicles according to the present invention.

In contrast to the abovementioned embodiment, where each load has its corresponding relay, only one relay 201 may be provided as shown in FIG. 5, to distribute power to a plurality of load drive lines 5a, 5b, etc. This example is suitable for such a construction that the loads 6a, 6b, etc. are provided in a headlamp or tail lamp which lights when a lighting switch 7 is turned on. In this example, the CPU of μCOM 203 monitors the voltage across each of current detection resistors 202a, 202b, etc. placed between the relay 201 and each of the load drive lines 5a, 5b, etc., to detect an excessive current, if any, flowing through each of those drive lines and, at the same time, read in that current value to decide the corresponding breaking time, so that when that breaking time has elapsed, it opens the relay 201 to break power to the loads 6a, 6b, etc.

According to this embodiment, the μCOM 203 is provided with a diagnostic function which rapidly identifies any of the load drive lines through which an excessive current responsible for the breaking of power has flowed. The μCOM 103 is also connected with a diagnostic indicator 205 which indicates the diagnostic results. The diagnostic indicator 205 is built in a device 20 and can be made up of indicator lamps corresponding to the load drive lines. The diagnostic results may of course be converted into digital data and sent to any other external devices other than the device 20.

This embodiment, in which only one relay is provided to break power, needs to break power in the shortest period of breaking time to protect the load drive lines and the loads if an excessive current is detected in any of a plurality of load drive lines. Therefore, it is simple in construction and very advantageous in manufacturing cost, although it suffers from a problem in which all loads other than the relevant ones will be stopped in operation.

As described above, according to an embodiment of the present invention, a plurality of breaking times according to the amount of an excessive current and also according to the capacity of a plurality of loads are beforehand stored in memory means. If an excessive current is detected and when the corresponding breaking time has elapsed, switching means is opened to break power to the corresponding load in an appropriate breaking time period in consideration of the capacity of the relevant load, i.e. the fuming characteristics of the relevant load drive line, thus improving the efficiency of feeding power.

In addition, the switching means is closed or opened in response to when the load is turned on or off respectively. Also, there need not be two separate switching means—one which breaks power for protecting the load drive lines from an excessive current and the other which is closed or opened in response when the load is turned on or off respectively, realizing an inexpensive construction.

A plurality of breaking time values are beforehand stored corresponding to the capacity of each of a plurality of loads and also to the amount of an excessive current. If an excessive current is detected and when the breaking time (corresponding to the capacity of the load connected to the load drive line through which that current flowed and also corresponding to that current value) has elapsed, the switching means is opened to break power to the relevant load via that load drive line in such appropriate breaking time as to take into consideration the capacity of that load, i.e. the fuming characteristics of that load drive line. Moreover, it is possible to cope with various products having different capacities for a plurality of loads only by changing the data of the current-breaking time characteristics stored in the memory means, thus reducing to the minimum the necessary variations due to the differences in load capacity.

The present invention may use a memory means including an external detachable nonvolatile memory whose contents are electrically erasable and programmable to store the current-breaking time characteristics data. Therefore, data may be easily changed, enabling the easy handling of variations due to the differences in load capacity only by changing the contents of the nonvolatile memory.

The data of a plurality of breaking time values corresponding to the capacity of each of a plurality of loads and also corresponding to the amount of an excessive current is stored beforehand. If an excessive current is detected and when an appropriate breaking time (corresponding to the capacity of the load connected to any load drive line through which that current flowed and also corresponding to that current amount) has elapsed, the switching means is opened to break power to that load via all the load drive lines. Therefore, if an excessive current flows through any one of the load drive lines, power can be broken in such breaking time as to take into consideration the capacity of the loads through which that excessive current flowed, i.e. the fuming characteristics of the relevant load drive lines. This can be done only with one switching means provided for the plurality of load drive lines, realizing a simple construction with an inexpensive manufacturing cost.

By identifying load drive lines through which an excessive current responsible for power breaking has flowed, it is possible to easily determine the loads or load drive lines responsible for power breaking even if power is broken for all the loads, facilitating fault diagnosis.

By indicating the diagnostic results, it is possible to rapidly know any loads or load drive lines responsible for power breaking even if power is broken for all the loads, facilitating the detection of the faulty portions.

What is claimed is:

1. A power-supply distributor for use in vehicles comprising:
    switching means, having a control input, by which power supplied from a battery via a power-supply line is distributed to load drive lines respectively connected to loads;
    current detection means which detects the amount of a current flowing through said load drive lines;
    memory means which stores a breaking time corresponding to a capacity of said loads and also corresponding to the amount of an excessive current flowing through said load drive lines; and
    control means which supplies a signal to the control input of said switching means to open said switching means in order to break power supply to the loads via said load drive lines when the amount of the current detected by said current detection means matches the amount of the excessive current and the breaking time has elapsed.

2. A power-supply distributor for use in vehicles as claimed in claim 1, wherein said control means supplies the signal to the control input of said switching means in response to when operation switches turn said loads on or off, to close or open said switching means respectively.

3. A power-supply distributor for use in vehicles comprising:
    a plurality of switching means, having a control input, by which power supplied from a battery via a power-supply line is distributed to a plurality of load drive lines respectively connected to loads;
    current detection means which detects the amount of a current flowing through each of said load drive lines;
    memory means which stores a plurality of breaking times corresponding to a capacity of each of said loads and also corresponding to the amount of an excessive current flowing through each of said load drive lines; and
    control means which supplies a signal to the control input of one of said plurality of switching means to open said one switching means so that power fed to the loads via said load drive lines is broken when the amount of the current of one of said load drive lines detected by said current detection means matches the amount of the excessive current of said one of said load drive lines and when a corresponding one of said breaking times has expired.

4. A power-supply distributor for use in vehicles as claimed in claim 3, wherein said memory means comprises an external detachable nonvolatile memory whose contents are electrically erasable and programmable.

5. A power-supply distributor for use in vehicles as claimed in claim 4, wherein said nonvolatile memory is of EEPROM.

6. A power-supply distributor for use in vehicles wherein power supplied from a battery via a power-supply line is distributed to a plurality of load drive lines respectively connected to loads, comprising:
    switching means, with a control input, placed between said battery and each of said plurality of load drive lines;
    current detection means which detects an amount of a current flowing through said each of said plurality of load drive lines;

memory means which stores a plurality of breaking times corresponding to a capacity of each of said loads and also corresponding to the amount of an excessive current flowing through said each of said plurality of load drive lines; and control means which supplies a signal to the control input of said switching means to open said switching means so that power fed to the loads via said load drive lines is broken when the amount of the current of one of said load drive lines detected by said current detection means matches the amount of the excessive current of said one of said load drive lines and when a corresponding one of said breaking times has expired.

7. A power-supply distributor for use in vehicles as claimed in claim 6, further comprising diagnosis means which identifies one of the load drive lines through which the excessive current has flowed.

8. A power-supply distributor for use in vehicles as claimed in claim 7, further comprising indication means which indicates the results of diagnosis by said diagnosis means.

* * * * *